United States Patent [19]

Abe et al.

[11] Patent Number: 5,177,794
[45] Date of Patent: Jan. 5, 1993

[54] MOVING OBJECT DETECTION APPARATUS AND METHOD

[75] Inventors: Shozo Abe, Kawasaki; Yuichi Togashi, Urayasu; Hajime Ohata, Yamato, all of Japan

[73] Assignee: Kabushiki Kaisha Toshiba, Kawasaki, Japan

[21] Appl. No.: 674,405

[22] Filed: Mar. 25, 1991

[30] Foreign Application Priority Data

Mar. 26, 1990 [JP] Japan .................................. 2-077609

[51] Int. Cl.⁵ .............................................. G06K 9/20
[52] U.S. Cl. ..................................... 382/48; 358/105; 358/108; 382/18
[58] Field of Search ....................... 382/48, 22, 44, 50, 382/51, 52, 6, 30, 34, , 18, 9; 358/105, 108

[56] References Cited

U.S. PATENT DOCUMENTS

| | | | |
|---|---|---|---|
| 4,288,815 | 9/1981 | Miles | 358/105 |
| 4,430,749 | 2/1984 | Schardt | 382/6 |
| 4,737,847 | 4/1988 | Araki et al. | 358/105 |
| 4,739,400 | 4/1988 | Veitch | 358/105 |
| 4,783,833 | 11/1988 | Kawabata et al. | 358/105 |
| 4,807,027 | 2/1989 | Muto | 358/105 |
| 4,872,051 | 10/1989 | Dye | 358/105 |
| 4,893,182 | 1/1990 | Gautraud et al. | 358/105 |
| 4,908,704 | 3/1990 | Fujioka et al. | 358/108 |
| 4,912,770 | 3/1990 | Seto et al. | 382/44 |

Primary Examiner—Joseph Mancuso
Attorney, Agent, or Firm—Cushman, Darby & Cushman

[57] ABSTRACT

A moving object detection apparatus is disclosed and includes a TV camera for capturing images in a monitoring zone. An image changing area is defined within a rectangular region, and is extracted from image signals corresponding to the images captured by the TV camera. From the image changing area, horizontal projective data is obtained. The horizontal projective data is compared with a standard horizontal projective data corresponding to a standard moving object to distinguish the moving object.

11 Claims, 5 Drawing Sheets

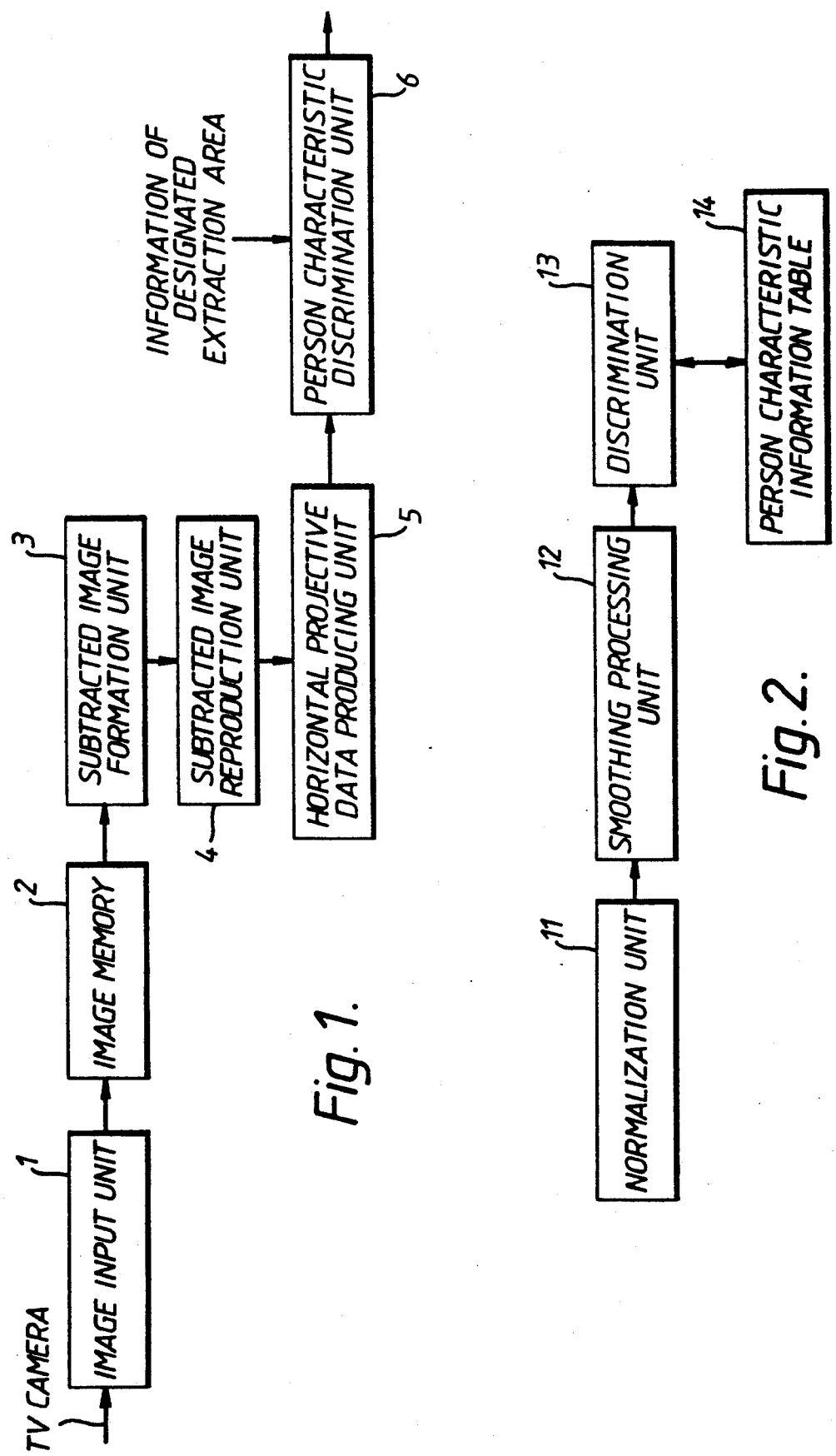

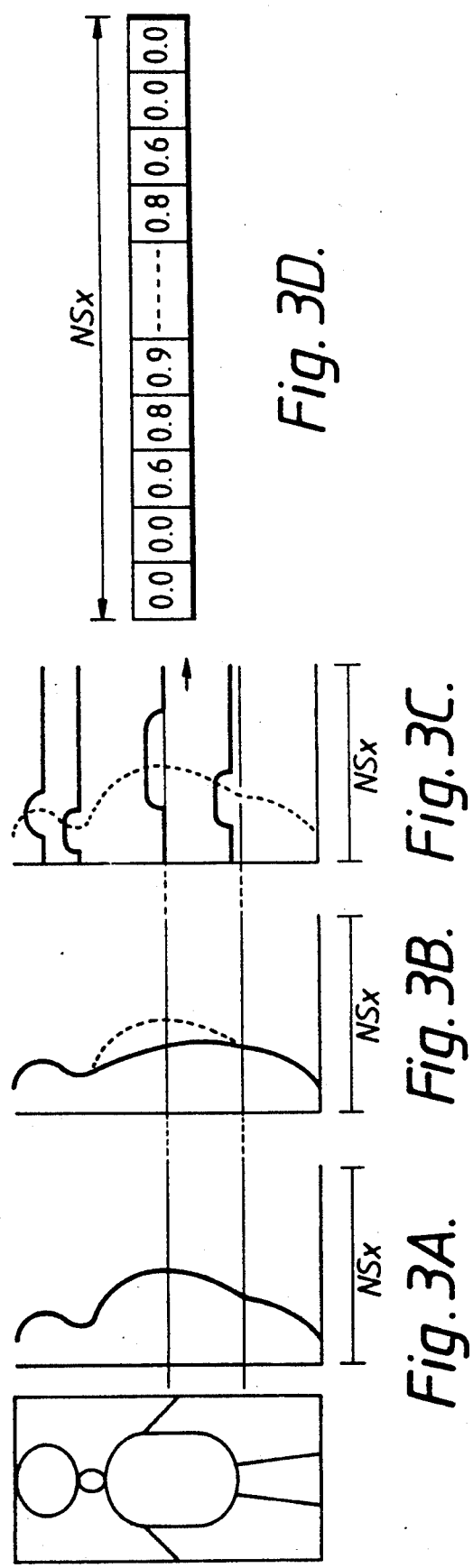

HORIZONTAL PROJECTIVE
CONFIGURATION DATA

MOVING OBJECT DETECTION APPARATUS AND METHOD

BACKGROUND OF THE INVENTION

1. Field of the Invention

The present invention relates to an apparatus and method for detecting a moving object such as a trespasser.

2. Description of the Related Art

In recent security systems, image monitoring apparatus for detecting trespassers and the like using images picked up by TV cameras have become widely popular. Such popularity owes much to inexpensive apparatuses realized by the remarkable progress of semiconductor techniques and the spread of digital image processing techniques.

In an image monitoring apparatus of this type, in order to detect a trespasser, a changing image portion generated when a trespasser moves within the image must be extracted from the video image. As a conventional method of extracting the changing image portion, a subtraction technique is performed using two time-serial images to extract an image of a changed portion (referred to herein as an image changing area). Furthermore, another method has been proposed. In this method, for areas where a trespasser does not pass, an operator of the monitoring apparatus sets a mask area using, for example, a light pen, to exclude these areas, so that a changing area is extracted from only the remainder of the monitored area to detect a trespasser.

However, in the above conventional apparatus, in order to detect a moving object, the extraction of the changing area is performed by using a single image subtraction. In such a case, even if the changing area is extracted within the limits of an extraction area which is designated beforehand, there was no guarantee that the area always indicates movement by a person. There is a risk of extracting a changing area due to noise caused by, for instance, meteorological conditions such as rain or wind. Consequently, there is a problem in the judgement as to whether or not a trespasser is present, by information related only to the size of the rectangular region of the extracted changing area, is largely dependent on the influence of noise. Thus, the discrimination factor was reduced and, at the same time, this resulted in poor reliability of this type of image monitoring apparatus.

SUMMARY OF THE INVENTION

It is an object of the present invention to provide a moving object detection apparatus and method for detecting moving objects, such as persons, with a high degree of reliability by removing image changing areas within the limits of an area of video monitoring.

According to the present invention there is provided an apparatus for detecting a moving object in a monitoring zone, the apparatus comprising a TV camera for capturing images in a monitoring zone; input means for inputting images from the TV camera to generate image signals corresponding to the monitoring zone, including the moving object; extraction means for extracting an image changing area from the image signals; data means for obtaining horizontal or vertical projective data from the image changing area defined as a rectangular region; memory means for storing standard horizontal or vertical projective data corresponding to a standard moving object; and comparison means for comparing the projective data obtained by the data means with the standard projective data from a memory means to identify the moving object.

Further according to the present invention there is provided a method for detecting a moving object, comprising the steps of capturing images in a monitored zone by a TV camera; inputting images from the TV camera to generate image signals corresponding to the monitored zone, including the moving object; extracting an image changing area from the image signals; obtaining horizontal or vertical projective data from the image changing area defined in a rectangular region; storing standard horizontal or vertical projective data corresponding to a standard moving object; and comparing the projective data obtained by the obtaining step with the standard projective data of the storing step to identify the moving object.

BRIEF DESCRIPTION OF THE DRAWINGS

FIG. 1 is a block diagram showing the whole structure of a moving object detection apparatus in one embodiment of the present invention;

FIG. 2 is a block diagram showing details of the person-characteristic discrimination unit of the moving object detection apparatus shown in FIG. 1;

FIGS. 3A and 3B are views showing the fluctuation of the horizontal projective patterns depending on the photographic environment;

FIG. 3C is a view showing standard horizontal projective patterns which have been prepared beforehand;

FIG. 3D is a view showing the degree of frequency of appearance for designated lines in FIG. 3C as numerical values;

DETAILED DESCRIPTION OF THE PREFERRED EMBODIMENT

Figure 4:
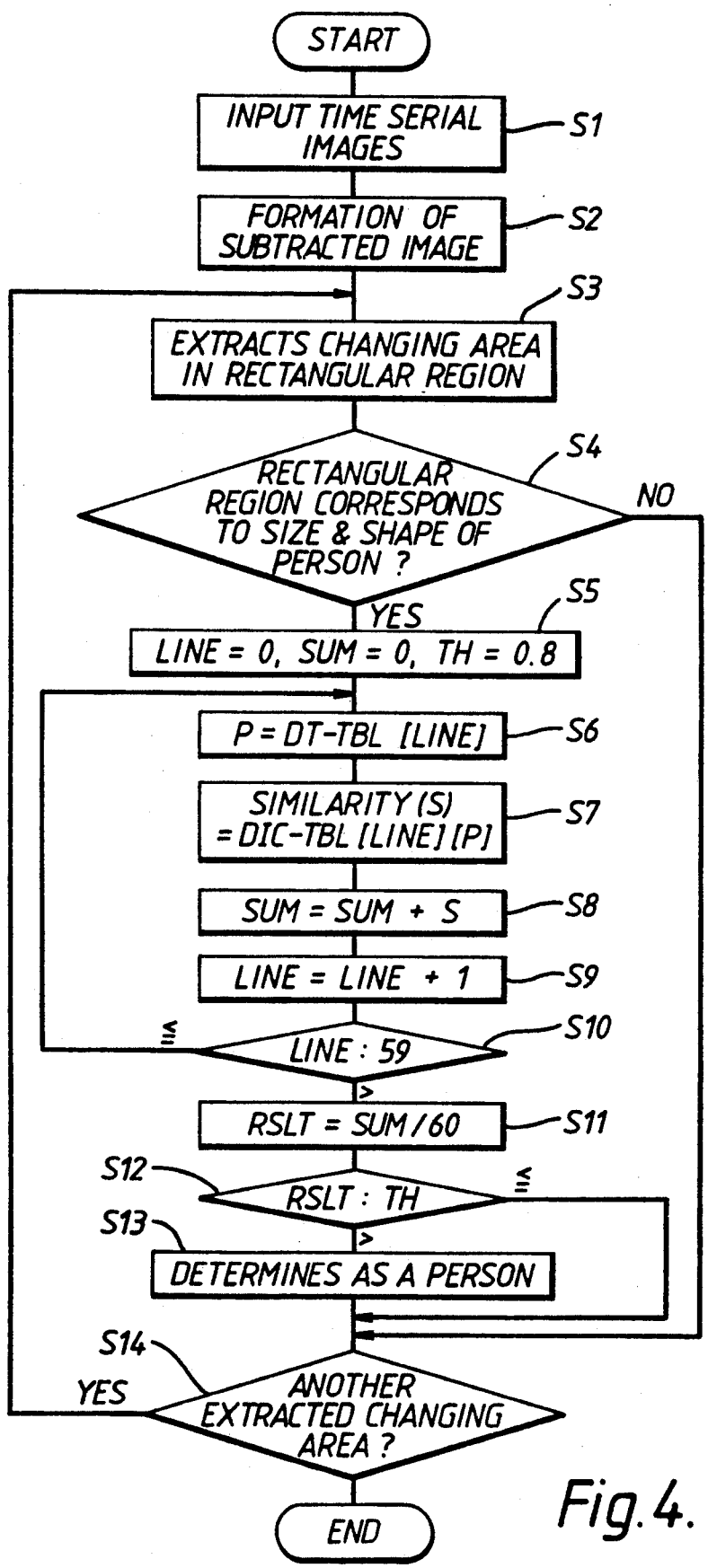
FIG. 4 is a flow chart showing the operation of the present invention.

Referring to the accompanying drawings, a detailed description will subsequently be given of the preferred embodiment of the present invention.

FIG. 1 is a block diagram showing the whole structure of a moving object detection apparatus of one embodiment of the present invention.

Photographed images of a monitoring zone are input to image input unit 1 from a TV camera. These images are temporarily transmitted to image memory 2. In subtracted image formation unit 3, image changing areas are extracted by using an extraction technique in a time scale of the successive multiple images which are stored in image memory 2. Therefore, in these subtracted images, as well as changing areas due to the movement of moving objects, image changing areas due to noise components are also included. Moreover, the image changing areas formed due to the movement of moving objects, are not always produced by extraction of the whole configuration of true moving objects.

Subtracted image reproduction unit 4 reproduces the configuration of true moving objects as clearly as possible, taking account of the above problems. As a reproduction method, a method of processing includes applying a logic filter to the subtracted binary images. In this case, noise such as isolated points can be eliminated simultaneously. Also, by the combined use of the information of input multi-value images corresponding to the subtracted binary images, this apparatus carries out more accurate configuration reproduction processing.

In horizontal projective data producing unit 5, the horizontal projective data are produced from the reproduced images of subtracted image reproduction unit 4. The above horizontal projective data is utilized at this time for obtaining the zone-separated zone data for every extraction area designated beforehand. Person characteristic discrimination unit 6 executes person-characteristic discrimination for extracted areas within the limits of the designated rectangular region by using the horizontal projective data having each configuration characteristic extracted from the input images.

Person-characteristic discrimination unit 6 in FIG. 1 will now be explained in detail, with reference to FIG. 2.

The input information for person-characteristic discrimination unit 6 is the image changing areas before perspective correction. Therefore, normalization of the size of the extracted area is carried out for the horizontal direction projective data by normalization unit 11. By this means, it is matched to the extraction area size in the center of the screen.

Figure 6A:
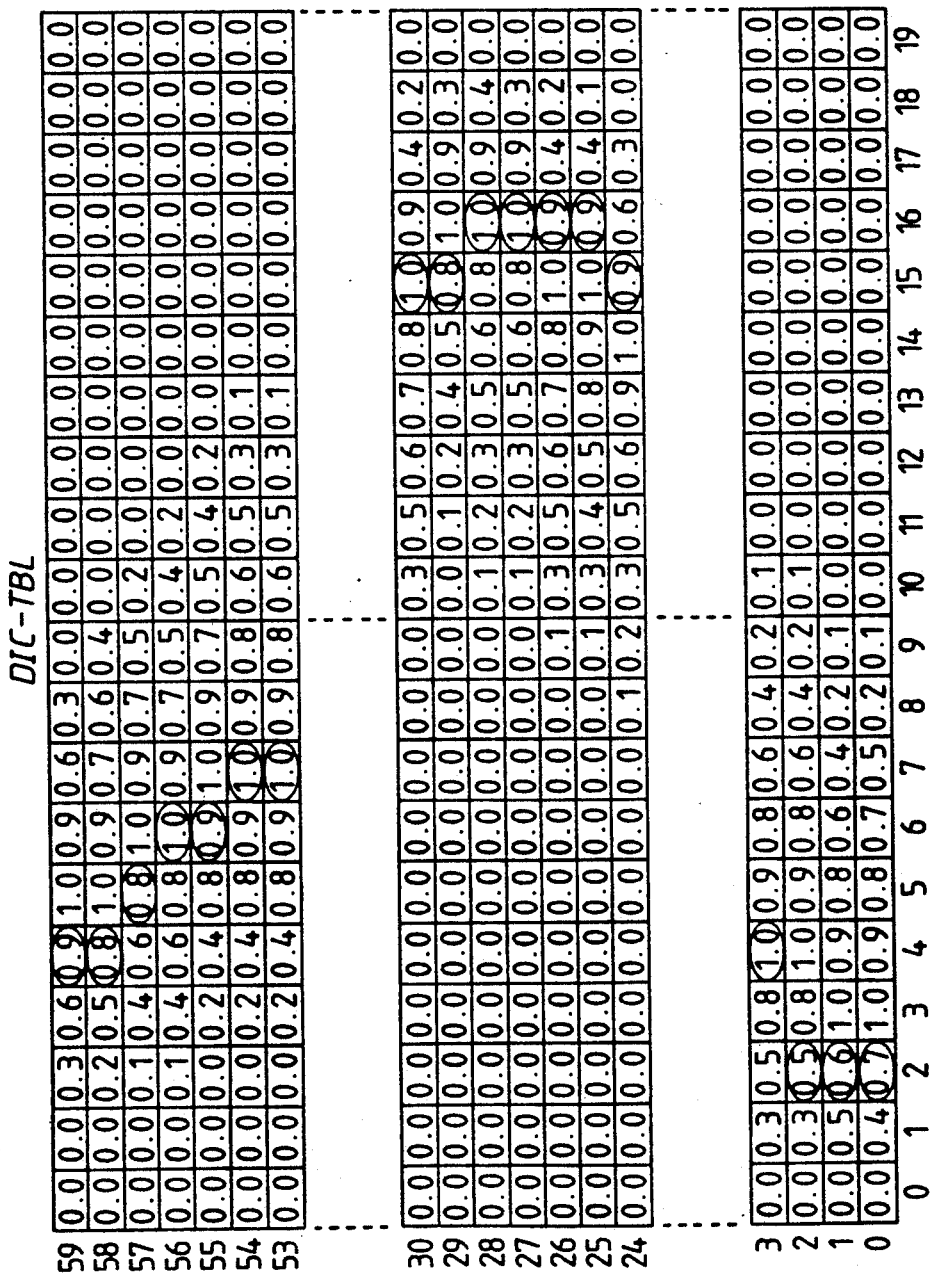
FIG. 6A is a dictionary table as an example.
Figure 6B:
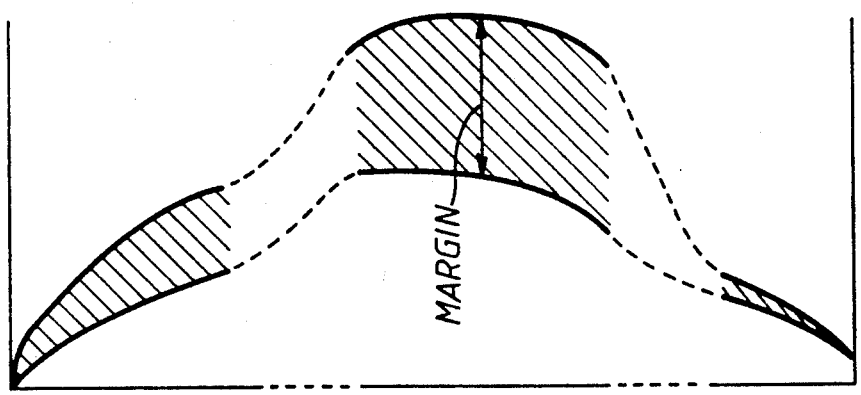
FIG. 6B is a view showing the horizontal projective patterns having a margin diagrammed according to the dictionary table shown in FIG. 6A.

Smoothing processing unit 12 extracts stable configurations by applying smoothing techniques to the normalized projective data. Person-characteristic information table 14 is shown in FIG. 6A in detail as dictionary table DIC-TBL. As shown in FIG. 6B, dictionary table DIC-TBL has a margin which is set beforehand and stored therein. The meaning of the margin will be described later in detail. Discrimination unit 13 carries out person recognition using the degree of likeness or similarity by executing comparison between the horizontal projective data obtained from the horizontal projective patterns obtained by the above method and the standard horizontal projective data stored in person characteristic information table 14 (dictionary table DIC-TBL).

FIGS. 3A and 3B show the horizontal projective patterns of subtracted binary images obtained from respective input images. FIG. 3A is the horizontal projective pattern corresponding to a person obtained from a general subtracted binary image. However, FIG. 3B shows the horizontal projective pattern for the case when the torso portion of a person is missing because pattern reproduction of the subtracted binary image was hindered because the moving person was moving towards the TV camera. That is, FIGS. 3A and 3B show that various configuration patterns are input, depending on the photographic environment and the alignment of the trespasser.

FIG. 3C shows the horizontal projective pattern (shown by a dotted line) which was prepared beforehand and stored in person-characteristic information table 14. However, the difference between FIGS. 3A and 3B is expressed numerically as the degree of frequency of appearance for the horizontal width NSx in each line unit of the horizontal projective data. FIG. 3D shows this in a numerical form. That is, for the LK line, the degree of frequency of appearance which the horizontal projective data of input image can obtain is expressed as values from 0.0 to 1.0. The closer the position of the numerical value to 1.0, the greater the possibility of appearance.

Thus, having considered the degree of frequency of appearance pattern for the torso portion of a moving person, it shows a high degree of frequency of appearance over a wide range. This is because it expresses the same type of likeness to a person for the respective configuration patterns of FIGS. 3A and 3B. That is, it is designed to correspond to the instability of the extracted configuration due to the difference in the photographic environment.

In this way, a histogram is extracted for the agreement coefficients in the respective lines, that is, the values from 0.0 to 1.0 for all lines, by carrying out matching with the input projected pattern. The center of gravity of this pattern is derived from the histogram and is taken as the numerical value of the likeness or similarity of the moving image to a person for the whole extracted pattern. In other words, the likeness or similarity to a person is expressed as a numerical value between, and including 0.0 to 1.0.

By taking all the frequencies of appearance of the likeness or similarity to a person above, a designated threshold value of, for instance, 0.3 as opposed to 1.0 can be derived, and more stable results can be obtained taking into consideration fluctuations of actual inputted images.

Here, apart from the center of gravity obtained from the above histogram, it is also possible to obtain the center point from among points with a certain width as representative of the maximum frequency. The horizontal projective patterns in FIGS. 3A and 3B are all patterns to which the normalization processing for size has been applied.

The operation of the present invention will now be explained more in detail, with reference to a flowchart shown in FIG. 4.

A TV camera successively takes pictures of a monitoring zone to obtain mulitiple time serial images. These images are input to image input unit 1 (FIG. 1), and analog signals corresponding to these images are converted into digital signals. The digital signals corresponding to the multiple serial time images are stored in image memory 2 (step S1). In subtracted image formation unit 3, a subtracted image is formed by the subtraction technique of the digital signals stored in image memory 2 (step S2). The formation of this subtracted image is described in U.S. patent application Ser. No. 07/476,323 (filed on Feb. 7, 1990) in detail, which is a copending application with this application.

There are image changing areas due to the movement of moving objects, such as persons, in the subtracted image obtained in subtracted image formation unit 3. A rectangular region is extracted from the image changing areas by obtaining vertical and horizontal projective data and enclosing, or circumscribing the projective data above a prescribed threshold value (step S3). This extracted rectangular region is compared with a standard rectangular region (step S4). The sizes in horizontal and vertical directions of the standard rectangular region correspond proportionally to the sizes in horizontal and vertical directions of a person, respectively. When the extracted rectangular region does not correspond to the standard rectangular region, the existence of another extracted image changing area in the subtracted image is determined in step S14.

Figure 5A:
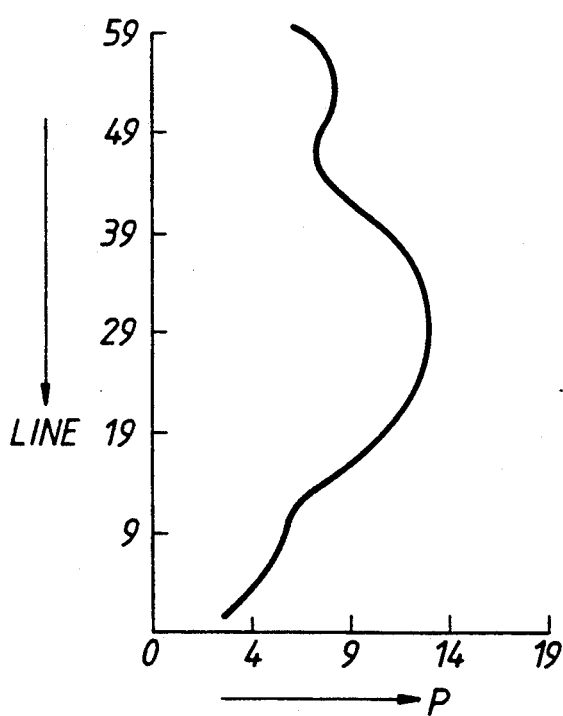
FIG. 5A is a view showing the horizontal projective pattern as an example.
Figure 5B:
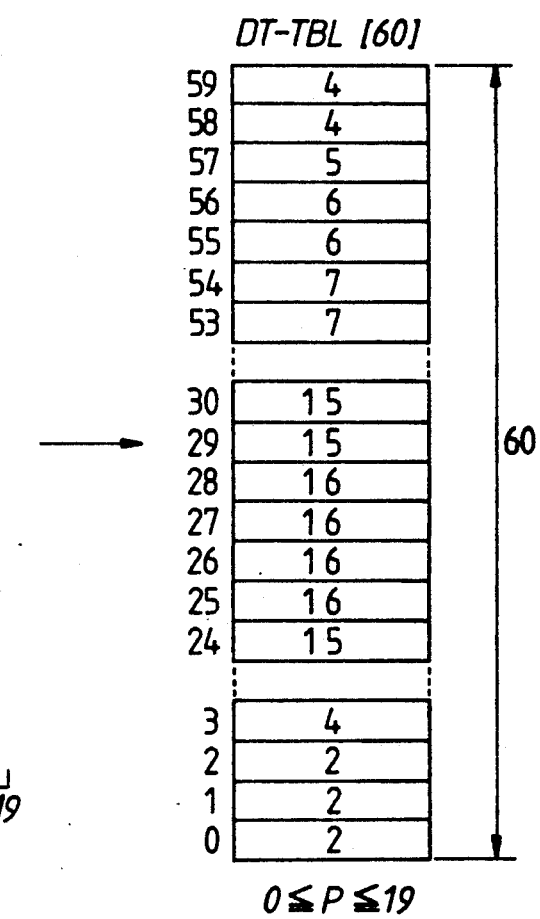
FIG. 5B is a data table obtained based on the horizontal projective pattern shown in FIG. 5A.

When the extracted rectangular region corresponds to the standard rectangular region in step S4, a data table DT-TBL shown in FIG. 5B is obtained in accordance with the horizontal direction projective pattern obtained from the subtracted image (FIG. 5A) in the rectangular region. This data table DT-TBL is stored in a memory (not shown). The data table DT-TBL is constructed by the position data of a curved line formed by an outline of the horizontal direction projective pattern. That is, numerical values 0 to 59 are assigned to Y axis coordinates and numerical values 0 to 19 as values P are assigned along the axis as shown in FIGS. 5A and 5B.

Person-characteristic information table 14 (shown in FIG. 2) is prepared as a dictionary table DIC-TBL, as shown in FIG. 6A. In the dictionary table DIC-TBL, numerical values 0.0 to 1.0 are assigned to every one of the 20 columns (0 to 19) along the horizontal direction. As also shown in FIG. 3D, numerical values 0.0 to 1.0 represent the degree of frequency of appearance for the horizontal width NSx in each horizontal line unit of the projective data. That is, for the LK line, the degree of frequency of appearance which the projective data in the horizontal direction of input can obtain is expressed as numerical values 0.0 to 1.0. The closer the position of the numerical value to 1.0, the higher the possibility of appearance. The 'margin' shown in FIG. 6B represents a scope within which the input projective data coincide with the data of the dictionary table DIC-TBL.

In step S5, counters LINE and SUM are set to '0', and parameter TH is set to '0.8'. This value '0.8' represents a threshold value. In step S6, P=2 corresponding to LINE=0 in data table DT-TBL (FIG. 5B) is obtained. Then, in step S7, '0-7', which is assigned in column 2 corresponding to LINE=0 in the dictionary table DIC-TBL (FIG. 6A), is obtained as Similarity (S). Thus, in next step S8, the sum value of similarity is obtained as SUM=0.7. Counter LINE is incremented until the counter LINE reaches to '59' during which step S6 to step S9 are repeatedly executed. That is, the similarity (S) of each line is obtained based on the data table DT-TBL shown in FIG. 5B as following TABLE:

TABLE

| LINE | P | Similarity (S) |
| --- | --- | --- |
| 59 | 4 | 0.9 |
| 58 | 4 | 0.8 |
| 57 | 5 | 0.8 |
| 56 | 6 | 1.0 |
| 55 | 6 | 0.9 |
| 54 | 7 | 1.0 |
| 53 | 7 | 1.0 |
| . | . | . |
| . | . | . |
| . | . | . |
| 30 | 15 | 1.0 |
| 29 | 15 | 0.8 |
| 28 | 16 | 1.0 |
| 27 | 16 | 1.0 |
| 26 | 16 | 0.9 |
| 25 | 16 | 0.9 |
| 24 | 15 | 0.9 |
| . | . | . |
| . | . | . |
| . | . | . |
| 3 | 4 | 1.0 |
| 2 | 2 | 0.5 |
| 1 | 2 | 0.6 |
| 0 | 2 | 0.7 |
| | | SUM = 56. |

When counter LINE shows '60', step S11 is excuted. In step S11, the value obtained in step S8 and stored in counter SUM is divided by value '60' to obtain a result and the result is stored in counter RSLT. As shown in the above, if the value of the counter SUM is '56.1', the value of counter RSLT becomes value '0.93'. This value '0.93' is compared with the parameter TH, in step S12. In this case, proceed to step S13 since the value '0.93' stored in counter RSLT is larger than the value '0.8' set in parameter TH. As a result, in step S13, the image taken by the TV camera in the monitoring zone is determined to be a person.

When the value stored in counter RSLT is less than the value '0.8' set in parameter TH in step S11, proceed to step S14 to determine whether another extracted changing area exists in the subtrated image or not. If the determination in step S14 is 'YES', proceed to step S3, if 'NO', the operation is completed.

The above-mentioned horizontal projective data, which constitutes the dictionary table DIC-TBL, are produced from the horizontal projective patterns which match the installation environment by collecting beforehand actual data for multiple changing areas using humans moving through the installation environment.

The present invention is not limited to the above embodiment. For instance, in this embodiment, one type of dictionary table in the horizontal direction has been explained. However, multiple types of dictionary tables can be prepared depending on the photographic environments. Also, for instance, when the characteristics which are obtained differ depending on whether it is a fine day, a very windy day, a rainy day, etc, dictionary tables which correspond to each of these environments can be prepared.

Also, the above processing can be used in reverse. That is, it is possible to obtain information, for instance, of a fine day or a rainy day by finding which prepared dictionary table corresponds to the horizontal projective patterns obtained from the input images.

Furthermore, by using the method of expressing dictionary tables corresponding to horizontal projective patterns which have a certain degree of margin, as in this embodiment, it can be applied to other characteristics, for instance to the horizontal projective patterns. In the case of moving groups of persons, this method cannot be applied for subtracted binary images to zones extracted in the state in which persons are grouped together. Therefore, by finding out the characteristics in projective patterns in the vertical direction for this type of subtracted binary image, at least a certain degree of accuracy for vague changing areas due to groups can be obtained, even if the image changing areas are large zones.

As many apparently widely different embodiments of the present invention may be made without departing from the spirit and scope thereof, it is to be understood that the present invention is not limited to the specific embodiments thereof except as defined in the appended claims.

What is claimed is:

1. An apparatus for detecting a moving object in a monitoring zone, the apparatus comprising:
   input means for inputting image signals from the monitoring zone;
   extraction means for extracting an image changing area from the image signals, the image changing area is defined as a rectangular region which encloses, or circumscribes, the moving object;
   data means for obtaining projective data from the extracted image changing area by projecting in a horizontal or in a vertical direction of the rectangular region;

memory means for storing standard projective data corresponding to a standard moving object to be compared to a detected moving object; and comparison means for comparing the projective data obtained by the data means with the standard projective data from the memory means to identify the moving object.

2. The apparatus of claim 1 wherein the extraction means includes means for forming a subtracted image from the image signals input by the input means at different times.

3. The apparatus of claim 1 wherein the standard projective data represents the degree of frequency of appearance of the projective data and includes a margin for the projective pattern in the horizontal direction.

4. The apparatus of claim 3 wherein the standard projective data is produced from images of a plurality of moving objects input by the input means.

5. The apparatus of claim 1 wherein the memory means includes a dictionary table containing first data to be assigned high values representing the first data close to the standard moving object and second data to be assigned low values representing the second data apart from the standard moving object.

6. An apparatus for detecting a person in a monitoring zone, the apparatus comprising:
input means for inputting image signals from the monitoring zone;
extraction means for extracting an image changing area from the image signals, the image changing area is defined as a rectangular region which includes a moving object;
data means for obtaining projective data from the rectangular region by projecting in a horizontal direction, the projective data having predetermined numerical values in a vertical direction;
memory means for storing standard projective data corresponding to standard person characteristics, the standard projective data having predetermined numerical values in the vertical direction;
comparison means for comparing each value of the projective data obtained by the obtaining means with corresponding values of the standard projective data from the memory means; and
determining means for determining whether the moving object is a person or not, in accordance with a result of the comparison means.

7. The apparatus of claim 6 wherein the extracting means includes means for forming a subtracted image from the image signals input by the input means at different times.

8. The apparatus of claim 6 wherein the standard projective data represents the degree of frequency of appearance of the projective data and includes a margin for the projective pattern in the horizontal direction.

9. The apparatus of claim 8 wherein the standard projective data is produced from images of a plurality of persons input by the input means.

10. The apparatus of claim 6 wherein the memory means includes a dictionary table containing first data to be assigned high values representing the first data close to the standard moving object and second data to be assigned low values representing the second data apart from the standard moving object.

11. A method for detecting a moving object, to be determined to be a person or not, by the comparison of the image of the moving object with a standard projective data corresponding to a standard person image which is previously prepared, the method comprising the steps of:
capturing images in a monitored zone by using a TV camera;
inputting images from the TV camera to generate image signals corresponding to the monitored zone;
extracting an image changing area distinguished by a moving object from the image signals;
defining a rectangular region including the changing image portion in the rectangular region;
obtaining projective data from the rectangular region by projecting to a horizontal direction;
comparing the projective data obtained by the obtaining step with the standard projective data; and
determining whether or not the moving object is a person in accordance with a comparing step.

* * * * *